(12) United States Patent
Nadler

(10) Patent No.: US 10,596,446 B2
(45) Date of Patent: Mar. 24, 2020

(54) SYSTEM AND METHOD OF FITNESS TRAINING IN VIRTUAL ENVIRONMENT

(71) Applicant: Hashplay Inc., San Francisco, CA (US)

(72) Inventor: Ingo Nadler, Bad Breisig (DE)

(73) Assignee: HASHPLAY INC., San Francisco, CA (US)

( * ) Notice: Subject to any disclaimer, the term of this patent is extended or adjusted under 35 U.S.C. 154(b) by 199 days.

(21) Appl. No.: 15/632,302

(22) Filed: Jun. 24, 2017

(65) Prior Publication Data

US 2018/0126247 A1 May 10, 2018

Related U.S. Application Data

(60) Provisional application No. 62/381,761, filed on Aug. 31, 2016, provisional application No. 62/354,199, filed on Jun. 24, 2016.

(51) Int. Cl.
*A63B 71/06* (2006.01)
*A63B 24/00* (2006.01)
(Continued)

(52) U.S. Cl.
CPC ........ *A63B 71/0622* (2013.01); *A63B 22/025* (2015.10); *A63B 24/0087* (2013.01); *H04N 13/376* (2018.05); *H04N 13/378* (2018.05); *H04N 13/398* (2018.05); *A63B 22/0076* (2013.01); *A63B 22/0605* (2013.01); *A63B 24/0075* (2013.01); *A63B 2024/0096* (2013.01); *A63B 2071/0636* (2013.01); *A63B 2071/0638* (2013.01); *A63B 2071/0666* (2013.01); *A63B 2220/18* (2013.01); *A63B 2220/30* (2013.01); *A63B 2220/40* (2013.01);
(Continued)

(58) Field of Classification Search
CPC .............. A63B 22/0076; A63B 22/025; A63B 22/0605; A63B 24/0075; A63B 24/0087; A63B 71/0622; A63B 2024/0096; A63B 2071/0636; A63B 2071/0638; A63B 2071/0666; A63B 2220/18; A63B 2220/30; A63B 2220/40; A63B 2220/803; A63B 2220/836; A63B 2225/50; H04N 13/178; H04N 13/344; H04N 13/376; H04N 13/378; H04N 13/398
See application file for complete search history.

(56) References Cited

U.S. PATENT DOCUMENTS 6,152,854 A * 11/2000 Carmein .............. A63B 22/025
482/4
7,224,326 B2 * 5/2007 Sefton ................ A63B 71/0622
345/8
(Continued)

*Primary Examiner* — Megan Anderson
(74) *Attorney, Agent, or Firm* — Ziegler IP Law Group, LLC

(57) ABSTRACT

A system for fitness training in a virtual environment. The system includes a cardiovascular training equipment, a head mounted device for presenting a video content associated with the virtual environment, and at least one computing device communicably coupled to the cardiovascular training equipment and the head mounted device. The at least one computing device is operable to provide the video content to the head mounted device, and modify at least one setting of the cardiovascular training equipment based on a metadata associated with the video content.

20 Claims, 2 Drawing Sheets

(51) Int. Cl.
    *A63B 22/02*     (2006.01)
    *H04N 13/376*    (2018.01)
    *H04N 13/378*    (2018.01)
    *H04N 13/398*    (2018.01)
    *A63B 22/00*     (2006.01)
    *A63B 22/06*     (2006.01)
    *H04N 13/178*    (2018.01)
    *H04N 13/344*    (2018.01)

(52) U.S. Cl.
    CPC ... *A63B 2220/803* (2013.01); *A63B 2220/836* (2013.01); *A63B 2225/50* (2013.01); *H04N 13/178* (2018.05); *H04N 13/344* (2018.05)

(56) References Cited

U.S. PATENT DOCUMENTS

| | | | |
|---|---|---|---|
| 9,339,691 B2* | 5/2016 | Brammer | A63B 71/0622 |
| 10,004,940 B2* | 6/2018 | Badarneh | A63B 22/0023 |
| 2009/0111670 A1* | 4/2009 | Williams | A63B 23/0464 |
| | | | 482/146 |
| 2011/0164044 A1* | 7/2011 | Huang | A63B 21/0004 |
| | | | 345/473 |
| 2016/0179206 A1* | 6/2016 | LaForest | G06F 3/017 |
| | | | 345/156 |
| 2018/0360340 A1* | 12/2018 | Rehse | A63B 24/0062 |
| 2019/0094981 A1* | 3/2019 | Bradski | H04N 13/204 |

\* cited by examiner

SYSTEM AND METHOD OF FITNESS TRAINING IN VIRTUAL ENVIRONMENT

TECHNICAL FIELD

The present disclosure relates generally to fitness training; and more specifically, to systems for fitness training in virtual environments. Furthermore, the present disclosure relates to methods of fitness training in virtual environments.

BACKGROUND

Conventionally, fitness training that includes cardiovascular exercises such as jogging, running, cycling and so forth, are performed outdoors. Generally, performing such exercises outdoors provides a person with incentives, such as, visual stimulation associated with exercising in a good location, nice weather, and so forth. Such visual stimulation may also be associated with having perceivable goals, for example, a goal to travel from one location to another as part of the exercise. It will be appreciated that the visual stimulation further offers psychological stimulation to the person that enhances a performance thereof and increases a motivation to continue the fitness training.

However, these days, such cardiovascular exercises are generally performed indoors, such as in gymnasiums, fitness studios and so forth. For example, the cardiovascular exercises are performed using cardiovascular training equipment including treadmills, stationary bicycles, rowing machines and so forth. It will be appreciated that in such an instance, the visual stimulation associated with performing the exercises outdoors is not received by the person. Consequently, owing to the lack of incentives associated with the visual stimulation, the performance and motivation of the person decreases.

Typically, the aforementioned limitations associated with exercising indoors is attempted to be overcome by using various techniques. For example, a lot of modern fitness equipments comprise a display for presenting videos to a user while performing an exercise. Such videos may be, for example, videos associated with outdoor environments. Moreover, a lot of gymnasiums, fitness studios and so forth attempt to simulate an outdoor environment within premises, for example, by using television screens to present videos of outdoor environments to patrons thereof. Additionally, an interior décor of such premises may be designed to mimic an outdoor environment, for example, by use of wallpapers, wall paint, wall murals and so forth. However, it will be appreciated that such techniques still fail to provide the visual stimulation associated with training outdoors and consequently, benefits obtained from such practice.

Therefore, in light of the foregoing discussion, there exists a need to overcome the aforementioned drawbacks associated with lack of visual stimulation during fitness training.

SUMMARY

The present disclosure seeks to provide a system for fitness training in a virtual environment. The present disclosure also seeks to provide a method of fitness training in a virtual environment. The present disclosure seeks to provide a solution to the existing problems associated with lack of visual stimulation during fitness training. An aim of the present disclosure is to provide a solution that overcomes at least partially the problems encountered in the prior art, and provides an easy-to-implement, economical and user-friendly system and method for providing visual stimulation during fitness training, for example, using virtual environments.

In a first aspect, an embodiment of the present disclosure provides a system for fitness training in a virtual environment, the system comprising:
- a cardiovascular training equipment;
- a head mounted device for presenting a video content associated with the virtual environment; and
- at least one computing device communicably coupled to the cardiovascular training equipment and the head mounted device;

wherein the at least one computing device is operable to:
- provide the video content to the head mounted device; and
- modify at least one setting of the cardiovascular training equipment based on a metadata associated with the video content.

In a second aspect, an embodiment of the present disclosure provides a method of fitness training in a virtual environment, the method comprising:
- providing a video content associated with the virtual environment by a computing device;
- presenting the video content using a head mounted device; and
- modifying at least one setting of a cardiovascular training equipment based on a metadata associated with the video content.

Embodiments of the present disclosure substantially eliminate or at least partially address the aforementioned problems in the prior art, and enables to provide visual stimulation during fitness training.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
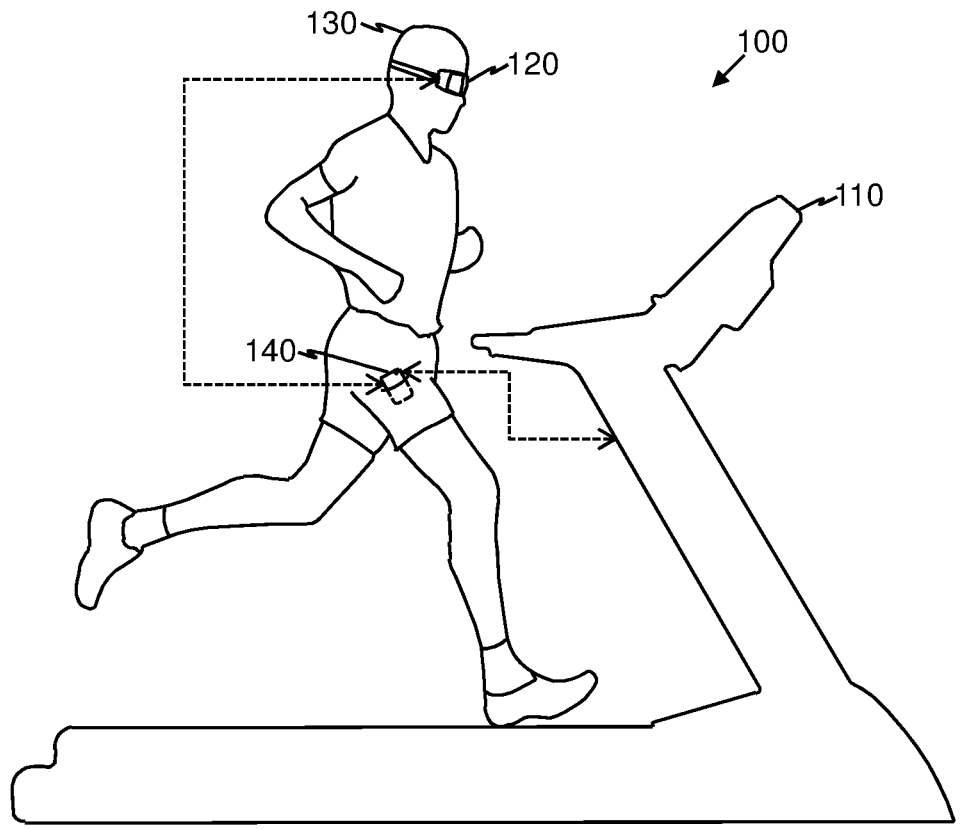
FIG. 1 is an illustration of a system for fitness training in a virtual environment, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented.

Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The term "virtual environment" refers to a surrounding that a user of the system wishes to be present in while performing an exercise associated with fitness training. Such virtual environment may be a real environment, such as, an environment that is at a different location from a current location of the user. Alternatively, such virtual environment may be an imaginary environment that is designed for providing a user with an immersive experience of virtual reality.

For example, the current location of the user of the system may be an indoor environment of a gymnasium, a fitness studio, an indoor stadium and so forth. However, the user may wish to perform fitness training at an outdoor environment, such as a park, a mountain biking trail and so forth. In such an instance, the "virtual environment" will be associated with the park, the mountain biking trail and so forth.

In another example, the current location of the user of the system may be a real environment, such as a park, a gymnasium, a fitness studio, an outdoor stadium and so forth. However, the user wishes to perform fitness training at an imaginary environment, such as a computer generated three-dimensional environment associated with a movie, a video game and so forth. In such an instance, the "virtual environment" will be associated with the computer generated three-dimensional environment of the movie, the video game and so forth.

The virtual environment may be rendered by presenting two distinct perspectives of a surrounding (such as left and right perspective views of the surrounding) to the user, by employing a technique such as stereoscopy. It will be appreciated that employing such technique will enable to provide the user with a perception of stereoscopic depth within the environment. For example, the user may interact with other users and/or objects within the virtual environment for an immersive experience within the virtual environment. Furthermore, the user can change their viewing direction, for example, to modify a visual perspective of the virtual environment that is presented thereto.

The term "cardiovascular training equipment" relates to devices or equipments that can be used by a user of the system to perform one or more physical exercises associated with fitness training. For example, the physical exercises may comprise cardiovascular exercises that enable the user to improve a cardiovascular fitness thereof. In one example, the cardiovascular training equipment includes a treadmill, a stationary bicycle (or exercise bike), a rowing machine and so forth.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Embodiments of the Present Disclosure

In a first aspect, an embodiment of the present disclosure provides a system for fitness training in a virtual environment, the system comprising:
  a cardiovascular training equipment;
  a head mounted device for presenting a video content associated with the virtual environment; and
  at least one computing device communicably coupled to the cardiovascular training equipment and the head mounted device;
wherein the at least one computing device is operable to:
  provide the video content to the head mounted device; and
  modify at least one setting of the cardiovascular training equipment based on a metadata associated with the video content.

In a second aspect, an embodiment of the present disclosure provides a method of fitness training in a virtual environment, the method comprising:
  providing a video content associated with the virtual environment by a computing device;
  presenting the video content using a head mounted device; and
  modifying at least one setting of a cardiovascular training equipment based on a metadata associated with the video content.

The system for fitness training in a virtual environment comprises the cardiovascular training equipment. The cardiovascular training equipment is one or more device that can be used by a user of the system to perform a physical exercise. In an example, the cardiovascular training equipment is one of, but not limited to, a treadmill, a stationary bicycle, a rowing machine and so forth. It will be appreciated that such cardiovascular training equipment allows the user to perform the exercise at a fixed location, such as an indoor location within a gymnasium, a fitness studio and so forth. Additionally, such cardiovascular training equipment may employ components such as a motor, a track, a weighted flywheel and so forth. Such components enable to provide one or more features to the cardiovascular training equipment, for example, to simulate different exercising conditions. For example, a treadmill located within a gymnasium may provide one or more features that allow a user thereof to change a speed, a resistance offered to enable an increase in effort applied by the user and so forth.

The system comprises the head mounted device for presenting a video content associated with the virtual environment. For example, the head mounted device includes at least one of virtual reality headsets, virtual reality goggles and virtual reality glasses. It will be appreciated that such head mounted device provides an immersive experience for a user thereof, for example, the user may have a feeling of being present within the environment. In such an instance, the head mounted device is worn by the user prior to commencing the fitness training. Furthermore, the head mounted device is operable to render the video content associated with the virtual environment, for example, on one or more displays associated therewith.

The video content comprises one or more videos that are captured using a camera arrangement. In an embodiment, the camera arrangement comprises at least one of a digital camera and/or a stereoscopic camera. Such videos relate to an experience of movement in an outdoor environment. In one example, one or more videos are captured using a stereoscopic camera along a mountain biking trail. In such an instance, when the video is presented to the user of the head mounted device, movement along the mountain biking trail is simulated to the user. In another example, various videos are captured using multiple synchronized digital cameras that are arranged to capture different visual perspectives associated with an environment. In such an instance, the various videos are combined to generate a stereoscopic video of the environment. In one embodiment, one or more frames of a video are repeated and adjacent frames of the video are blended together. Such technique of repeating the one or more frames and blending together adjacent frames enables to reduce an amount of processing required to be performed on the video while still enabling to provide a smooth video playback experience.

The system comprises at least one computing device communicably coupled to the cardiovascular training equipment and the head mounted device. In one example, the computing device comprises a memory associated therewith. In such an instance, the at least one computing device is operable to store the video content associated with the virtual environment. In an example, the at least one computing device is communicably coupled to a server arrangement. In such an instance, the server arrangement is operable to store the video content associated with the virtual environment, for example, in a database associated therewith. For example, the server arrangement is associated with a third-party service provider, such as, a provider of stereoscopic videos to be presented on virtual reality devices.

In one embodiment, the computing device is at least one of a smartphone, a wearable device and/or a device embedded into the cardiovascular training equipment. For example, the computing device is a smartphone or a wearable device (such as a smart watch) associated with the user. In another example, the computing device forms a part of the cardiovascular training equipment and comprises one or more components such as a memory, a display and so forth. The computing device may be operable to store the video content associated with one or more virtual environments. Such stored video content may be associated with a training program provided on the cardiovascular training equipment. For example, a training program of a treadmill comprises 'Uphill Jog'. In such instance, the video content is associated with virtual environments of uphill terrains.

The at least one computing device is operable to provide the video content to the head mounted device. For example, the at least one computing device is operable to retrieve the video content from the memory associated therewith and subsequently, transmit the video content to the head mounted device to be presented thereon. In one example, playback of the video content is performed on the computing device and the video content is displayed on the one or more displays associated with the head mounted device (that is communicably coupled to the computing device). In one embodiment, the computing device is communicably coupled to the head mounted device using at least one of a wired connection and/or a wireless connection. For example, the wired connection employs at least one cable for communicably coupling the at least one computing device to the head mounted device. In an embodiment, the system further comprises a connector for communicably coupling the at least one computing device to the head mounted device. For example, the head mounted device and/or the at least one computing device comprises a HDMI (High-Definition Multimedia Interface) port. In such an instance, the connector comprises a HDMI connector that is used to couple the at least one computing device to the head mounted device to provide high definition video content and optionally, audio content associated therewith.

According to an embodiment, the wired connection is further employed to deliver electrical power to the head mounted device. In another embodiment, the wireless connection employs at least one of Bluetooth, infrared, ZigBee, Wi-Fi and/or internet. For example, the system further comprises a server arrangement that is communicably coupled to the at least one computing device via the internet. In such an instance, the server arrangement is used to stream the video content stored on the computing device to the head mounted device.

The at least one computing device is operable to modify at least one setting of the cardiovascular training equipment based on a metadata associated with the video content. In an embodiment, the metadata comprises at least one of a distance, a speed, an inclination and/or a resistance associated with the virtual environment of the video content. In an example, the camera arrangement that is used to capture the video content further comprises one of, but not limited to, speed sensors, tilt sensors, inclinometers, and so forth. Such sensors are operable to capture the metadata associated with the video content. Furthermore, the metadata may be associated with a timestamp of the video content. In one example, the virtual environment is associated with a hillside terrain that comprises a jogging track at different inclinations with respect to horizontal. For example, the video content having duration of 10 minutes comprises a first portion of duration 3 minutes depicting the track having an elevation of 0°, a second portion of duration 4 minutes depicting the track having elevation of 25° and a third portion of duration 3 minutes depicting the track having elevation of 5° with respect to the horizontal. In such an instance, the metadata associated with such video content corresponds to inclinations of 0°, 25° and 5° associated with timestamps of 3 minutes, 7 minutes and 10 minutes respectively.

According to one embodiment, the at least one setting of the cardiovascular training equipment comprises a distance setting, a speed setting, an inclination setting and/or a resistance setting. For example, the at least one setting relates to an operational parameter associated with the cardiovascular training equipment. In one example, a speed setting associated with a treadmill enables a user thereof to specify the speed of movement of a track associated with the treadmill. In such an instance, the user will be required to move at the specified speed based on the speed setting of the treadmill. Furthermore, it will be appreciated that a rate of playback (such as, frames per second) of the video content presented to the user on the head mounted device will depend on the at least one setting of the cardiovascular training equipment.

In an example, the video content is associated with rowing in a virtual environment of a sea. Furthermore, the cardiovascular training equipment may be a rowing machine and different water conditions may be simulated in the virtual environment. In such an instance, based on simulation of a calm sea condition in the virtual environment, a resistance setting of the rowing machine is reduced and a speed setting thereof is increased. However, if a rough sea condition is simulated in the virtual environment, the resistance setting the rowing machine is increased whereas the speed setting thereof is reduced. In another example, the video content is associated with bicycling in a virtual environment of a mountain biking trail. Furthermore, the cardiovascular training equipment is a stationary bicycle. Moreover, different paths associated with the mountain biking trail are presented to the user. In such an instance, based on selection of one of the different paths that the user wishes to travel along, a distance setting of the stationary bicycle is modified (such as increased or decreased).

In an embodiment, the head mounted device comprises at least two displays for rendering the video content associated with the virtual environment. In one example, the head mounted device comprises two displays, wherein each display is operable to provide a slightly offset visual perspective of the virtual environment to each eye of the user. In such an instance, the video content comprises at least two videos, such as, videos of the virtual environment that are slightly offset from each other. Further, providing such videos to the two display devices enables the user to perceive a stereoscopic depth associated with the virtual environment. In one embodiment, the at least two displays comprise at least one of a curved display, a thin film display, a LCD (liquid crystal display), an LED (light-emitting diode) display and/or an OLED (organic light-emitting diode) display.

The head mounted device further comprises at least two lenses arranged in front of the at least two displays. For example, the at least two lenses are arranged in an optical path from the at least two display to eyes of the user. In one example, the at least two lenses are operable to magnify the video content rendered on the at least two displays. In such an instance, the magnification of the video content further enables the user to perceive stereoscopic depth associated with various objects presented in the virtual environment.

The head mounted device further comprises a sensor arrangement for sensing a sensor data associated with the head mounted device. According to one embodiment, the sensor arrangement comprises at least one of an accelerometer, and/or a gyroscope. For example, the sensor arrangement enables the head mounted device to measure movement of head of the user. Such measurement of movement of head of the user enables the head mounted device to sense a viewing direction of the user. Consequently, a visual perspective of the environment that is presented to the user is modified according to the movement of the head thereof. In one embodiment, the sensor data comprises at least one of linear movement of the head mounted device and/or rotation of the head mounted device. For example, the user moves their head linearly towards left of current viewing direction thereof. In such an instance, the view of the environment that is presented to the user is shifted to the left such that the visual perspective of the virtual environment corresponds to the viewing direction of the user after the movement of the head. In another example, the user rotates their head diagonally from the current viewing direction thereof. In such an instance, the visual perspective that is presented to the user is shifted to correspond to the rotational movement of the head of the user.

According to an embodiment, the at least one computing device is operable to employ an algorithm to position a point of reference associated with the user to a center of the virtual environment. In one example, the virtual environment is mapped along an imaginary sphere such that the head of the user is the center of such imaginary sphere. Such mapping enables to present an accurate visual perspective of the visual environment on the head mounted device based on a viewing direction of the user. For example, the user may change their viewing direction to look behind them. In such an instance, the visual perspective of the virtual environment that is presented to the user is associated with a diametrically opposite point of the current viewing direction of the user, on a sphere that the virtual environment is mapped thereto.

The head mounted device further comprises a transmitter that is operable to transmit the sensor data to the at least one computing device. For example, the transmitter is operable to transmit the sensor data to the at least one computing device using the at least one cable that is used for communicably coupling the at least one computing device to the head mounted device. In another example, the transmitter is operable to transmit the sensor data to the at least one computing device wirelessly, such as, using one of, but not limited to, Bluetooth, infrared, ZigBee, Wi-Fi and/or internet.

In an embodiment, the system further comprises an image splitter for splitting the video content associated with the virtual environment to be rendered by the at least two displays of the head mounted device. For example, the image splitter is operable to employ an algorithm to process the video content provided by the computing device, such that an output is obtained comprising videos of slightly offset visual perspectives of the virtual environment. It will be appreciated that such videos when rendered by the at least two displays of the head mounted device, enable the user to perceive a stereoscopic depth associated with the virtual environment presented on the head mounted device. According to one embodiment, the system comprises two connectors for communicably coupling the at least one computing device to each of the two displays of the head mounted device. For example, a different video, such as, of a slightly offset visual perspective of the virtual environment is provided to each of the two displays using the two connectors. It will be appreciated that enabling perception of such stereoscopic depth in the virtual environment enables a more immersive experience for the user. Such immersive experience further increases a visual stimulation provided to the user and consequently, may enable to increase a performance of the user.

In one embodiment, the system comprises two computing devices. For example, each of the two computing devices is operable to provide a video associated with the virtual environment to two displays of the head mounted device, such that each video presents a slightly offset visual perspective of the virtual environment. In such an instance, the system further comprises two connectors that are operable to couple each of the two computing devices to a display of the two displays. Alternatively, the two computing devices are communicably coupled to the head mounted device using a wireless connection.

The present description also relates to the method as described above. The various embodiments and variants disclosed above apply mutatis mutandis to the method.

The present disclosure provides the system and the method of fitness training in a virtual environment. The system comprises the cardiovascular training equipment, the head mounted device that is worn by the user and the at least one computing device that is communicably coupled to the cardiovascular training equipment and the head mounted device. The computing device is operable to provide the video content to the head mounted device. The video content that is provided by the computing device reduces a requirement of the head mounted device to include one or more components such as a memory for storing the video content. Therefore, size and weight associated with the head mounted device can be reduced, enabling a comfortable experience for the user wearing the head mounted device. Furthermore, the computing device is operable to modify the at least one setting of the cardiovascular training equipment based on a metadata associated with the video content. The metadata associated with the video content enables to capture different conditions associated with the virtual environment, thereby, enabling a more immersive experience to be provided to the user. Additionally, modification of the at least one setting of the cardiovascular training equipment enables to simulate the different conditions presented in the virtual environment. It will be appreciated that simulation of such conditions enables to provide a realistic experience for user of the system while performing the fitness training. Additionally, enabling fitness training in the virtual environment enables to provide a visual stimulation to the user. The virtual environment presented to the user may depend on preferences and/or requirements of the user. Moreover, providing such visual stimulation using the virtual environment may enable to increase a performance and motivation of the user. Consequently, drawbacks associated with conventional fitness training are substantially overcome and an economical, easy-to-implement and user-friendly system and method for fitness training in a virtual environment are provided.

Detailed Description of the Drawings

Referring to FIG. 1, illustrated is a system 100 for fitness training in a virtual environment, in accordance with an embodiment of the present disclosure. The system 100 comprises a cardiovascular training equipment 110 and a head mounted device 120 for presenting a video content associated with the virtual environment. As shown, the head mounted device 120 is worn by a user 130 of the system 100. Moreover, the system 100 comprises a computing device 140 communicably coupled to the cardiovascular training equipment 110 and the head mounted device 120. The computing device 140 is shown to be a smartphone associated with the user 130. However, the computing device 140 can be, for example, a wearable device or a device that is embedded into the cardiovascular training equipment 110.

FIG. 1 is merely an example, which should not unduly limit the scope of the claims herein. A person skilled in the art will recognize many variations, alternatives, and modifications of embodiments of the present disclosure.

Figure 2:
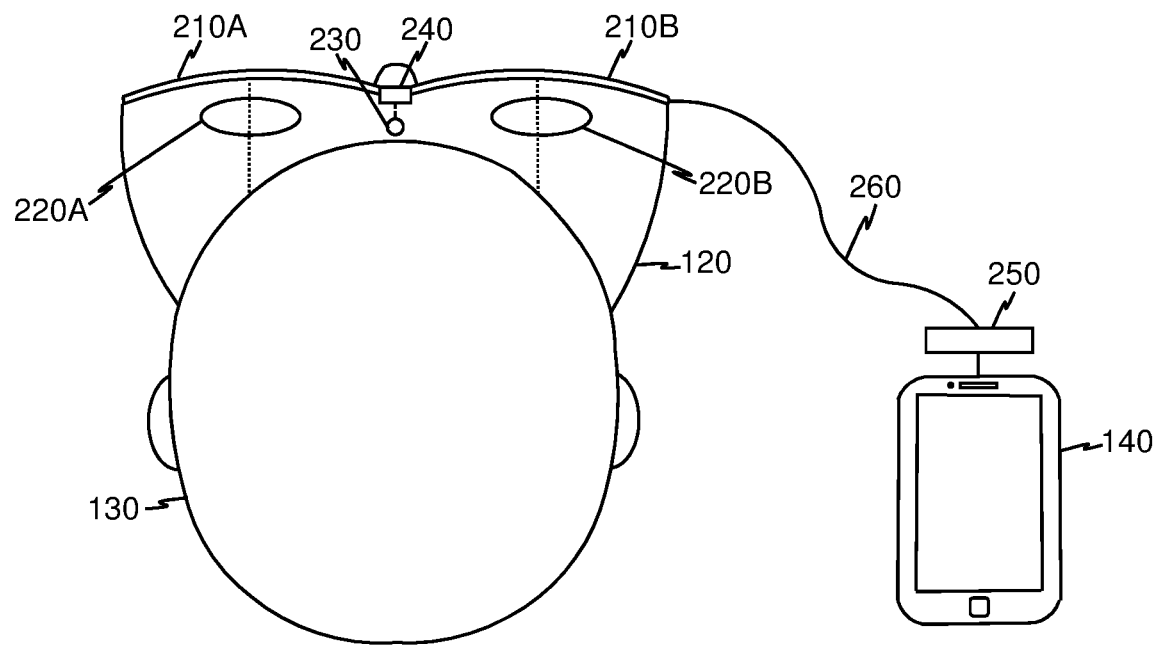
FIG. 2 is a schematic illustration of an environment for implementing the system of FIG. 1, in accordance with an embodiment of the present disclosure.

Referring to FIG. 2, shown is a schematic illustration of an environment for implementing the system 100 of FIG. 1, in accordance with an embodiment of the present disclosure. As shown, the head mounted device 120 is worn on head of the user 130. The head mounted device 120 further comprises two displays 210A-B for rendering the video content associated with the virtual environment and two lenses 220A-B arranged in front of the at least two displays 210A-B. Moreover, the head mounted device 120 comprises a sensor arrangement 230 for sensing a sensor data associated with the head mounted device 120 and a transmitter 240 that is operable to transmit the sensor data to the computing device 140. Furthermore, the computing device 140 is communicably coupled to an image splitter 250 for splitting the video content associated with the virtual environment to be rendered by the two displays 210A-B of the head mounted device 120. As shown, a connector 260 is used for communicably coupling the computing device 140 to the head mounted device 120.

FIG. 2 is merely an example, which should not unduly limit the scope of the claims herein. A person skilled in the art will recognize many variations, alternatives, and modifications of embodiments of the present disclosure.

Figure 3:
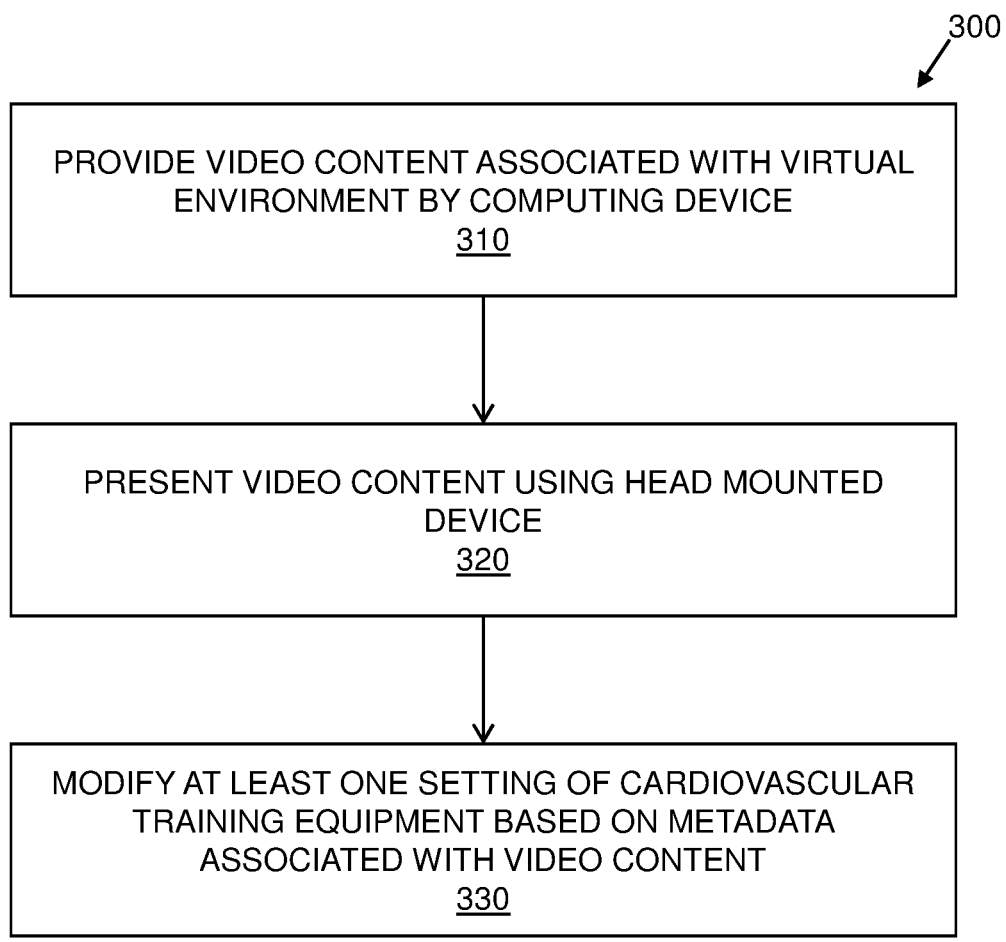
FIG. 3 is an illustration of steps of a method of fitness training in a virtual environment, in accordance with an embodiment of the present disclosure.

Referring to FIG. 3, illustrated are steps of a method 300 of fitness training in a virtual environment, in accordance with an embodiment of the present disclosure. At step 310, a video content associated with the virtual environment is provided by a computing device. At step 320, the video content is presented using a head mounted device. At step 330, at least one setting of a cardiovascular training equipment is modified based on a metadata associated with the video content.

The steps 310 to 330 are only illustrative and other alternatives can also be provided where one or more steps are added, one or more steps are removed, or one or more steps are provided in a different sequence without departing from the scope of the claims herein. In an example, the metadata comprises at least one of a distance, a speed, an inclination, and/or a resistance associated with the virtual environment of the video content. In another example, the at least one setting comprises a distance setting, a speed setting, an inclination setting, and/or a resistance setting. In one example, the computing device is at least one of a smartphone, a wearable device, or a device embedded into the cardiovascular training equipment. In another example, the head mounted device comprises at least two displays for rendering the video content associated with the virtual environment, at least two lenses arranged in front of the at least two displays, a sensor arrangement for sensing a sensor data associated with the head mounted device, and a transmitter that is operable to transmit the sensor data to the at least one computing device. In an example, the method further comprises communicably coupling the at least one computing device to the head mounted device using a connector. In another example, the method further comprises splitting the at least one video associated with the virtual environment to be provided to the at least two displays of the head mounted device. In one example, the at least two displays comprise at least one of a curved display, a thin film display, a LCD display, an LED display, and/or an OLED display. In another example, the sensor arrangement comprises at least one of an accelerometer, and/or a gyroscope. In an example, the sensor data comprises at least one of linear movement of the head mounted device, and/or rotation of the head mounted device.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for fitness training in a virtual environment, the system comprising:
   a cardiovascular training equipment;
   a head mounted device for presenting a video content associated with the virtual environment; and
   at least one computing device communicably coupled to the cardiovascular training equipment and the head mounted device;
   wherein the at least one computing device is operable to:
      provide the video content to the head mounted device; and
      modify at least one setting of the cardiovascular training equipment based on a metadata associated with the video content.

2. The system according to claim 1, wherein the head mounted device comprises:
   at least two displays for rendering the video content associated with the virtual environment;
   at least two lenses, wherein each of the at least two lenses is arranged in front of a respective one of the at least two displays;
   a sensor arrangement for sensing a sensor data associated with the head mounted device; and
   a transmitter that is operable to transmit the sensor data to the at least one computing device.

3. The system according to claim 2, further comprising a connector for communicably coupling the at least one computing device to the head mounted device.

4. The system according to claim 3, further comprising an image splitter for splitting the video content associated with the virtual environment to be rendered by the at least two displays of the head mounted device.

5. The system according to claim 4, wherein the at least two displays comprise at least one of: a curved display, a thin film display, a LCD display, an LED display, and an OLED display.

6. The system according to claim 2, wherein the sensor arrangement comprises at least one of: an accelerometer and a gyroscope.

7. The system according to claim 2, wherein the sensor data comprises at least one of: linear movement of the head mounted device, and rotation of the head mounted device.

8. The system according to claim 1, wherein the metadata comprises at least one of: a distance, a speed, an inclination, and a resistance associated with the virtual environment of the video content.

9. The system according to claim 1, wherein the at least one setting of the cardiovascular training equipment comprises: a distance setting, a speed setting, an inclination setting, and a resistance setting.

10. The system according to claim 1, wherein the computing device is at least one of: a smartphone, a wearable device, and a device embedded into the cardiovascular training equipment.

11. A method of fitness training in a virtual environment, the method comprising:
   providing a video content associated with the virtual environment by a computing device;
   presenting the video content using a head mounted device; and
   modifying at least one setting of a cardiovascular training equipment based on a metadata associated with the video content.

12. The method according to claim 11, wherein the head mounted device comprises:
   at least two displays for rendering the video content associated with the virtual environment;
   at least two lenses, wherein each of the at least two lenses is arranged in front of a respective one of the at least two displays;
   a sensor arrangement for sensing a sensor data associated with the head mounted device; and
   a transmitter that is operable to transmit the sensor data to the at least one computing device.

13. The method according to claim 12, further comprising communicably coupling the at least one computing device to the head mounted device using a connector.

14. The method according to claim 13, further comprising splitting the video content associated with the virtual environment to be provided to the at least two displays of the head mounted device.

15. The method according to claim 14, wherein the at least two displays comprise at least one of: a curved display, a thin film display, a LCD display, an LED display, and an OLED display.

16. The method according to claim 12, wherein the sensor arrangement comprises at least one of: an accelerometer, and a gyroscope.

17. The method according to a claim 12, wherein the sensor data comprises at least one of: linear movement of the head mounted device, and rotation of the head mounted device.

18. The method according to claim 11, wherein the metadata comprises at least one of: a distance, a speed, an inclination, and a resistance associated with the virtual environment of the video content.

19. The method according to claim 11, wherein the at least one setting comprises: a distance setting, a speed setting, an inclination setting, and a resistance setting.

20. The method according to claim 11, wherein the computing device is at least one of: a smartphone, a wearable device, and a device embedded into the cardiovascular training equipment.

* * * * *